United States Patent [19]

Hill

[11] 4,330,312

[45] May 18, 1982

[54] APPARATUS FOR FLOWING STREAMS OF FIBER-FORMING MATERIAL FOR ATTENUATION TO FIBERS OR FILAMENTS

[75] Inventor: Robert L. Hill, Pataskala, Ohio

[73] Assignee: Owens-Corning Fiberglas Corporation, Toledo, Ohio

[21] Appl. No.: 203,297

[22] Filed: Nov. 3, 1980

[51] Int. Cl.³ .......................................... C03B 37/025
[52] U.S. Cl. ............................................. 65/1; 65/2; 65/12
[58] Field of Search ...................... 65/2, 11 W, 12, 1

[56] References Cited

U.S. PATENT DOCUMENTS

| | | | |
|---|---|---|---|
| 3,142,551 | 7/1964 | Von Wranau | 65/1 |
| 3,334,981 | 8/1967 | Glaser | 65/12 |
| 3,574,581 | 4/1971 | Strickland et al. | 65/1 |
| 3,840,358 | 10/1974 | Whitfield | 65/1 |
| 3,905,790 | 9/1975 | Strickland | 65/12 X |

Primary Examiner—Robert L. Lindsay, Jr.
Attorney, Agent, or Firm—Ronald C. Hudgens; Kenneth H. Wetmore; Harry O. Ernsberger

[57] ABSTRACT

The disclosure embraces a method of and apparatus for processing heat-softened glass wherein a body of refractory has a cavity containing heat-softened glass and a floor construction associated with the body of refractory. The floor construction includes platinum alloy means having rows of orifices for flowing glass streams from the glass in the cavity in the refractory body and members of refractory associated with the platinum alloy means disposed between regions of certain of the rows of stream flow orifices.

17 Claims, 12 Drawing Figures

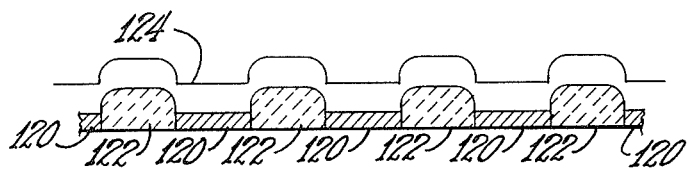
FIG. 7
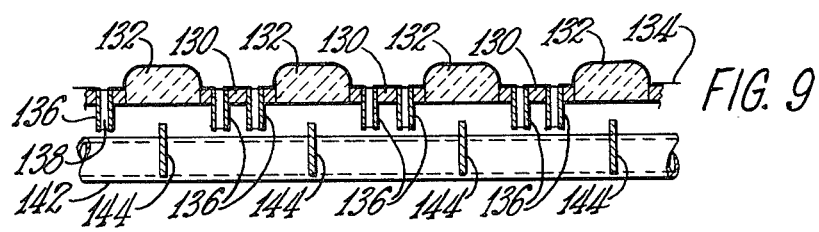
FIG. 9
FIG. 8
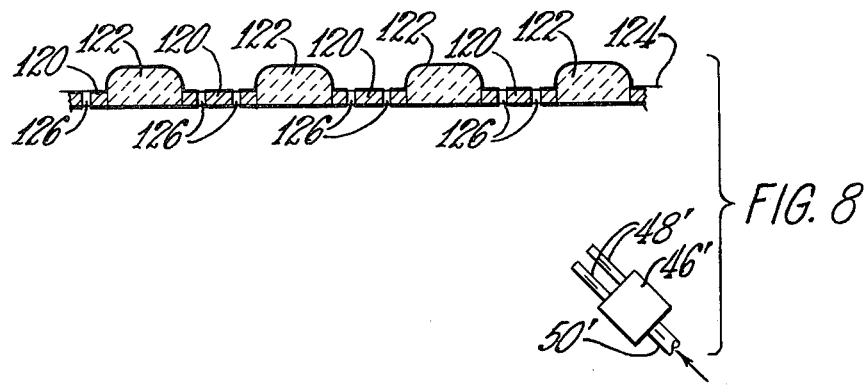
FIG. 2
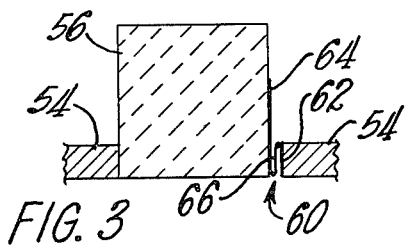
FIG. 3
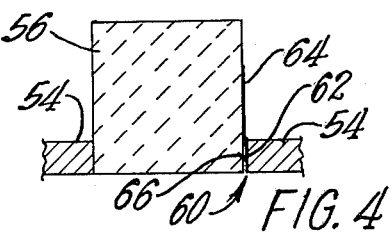
FIG. 4

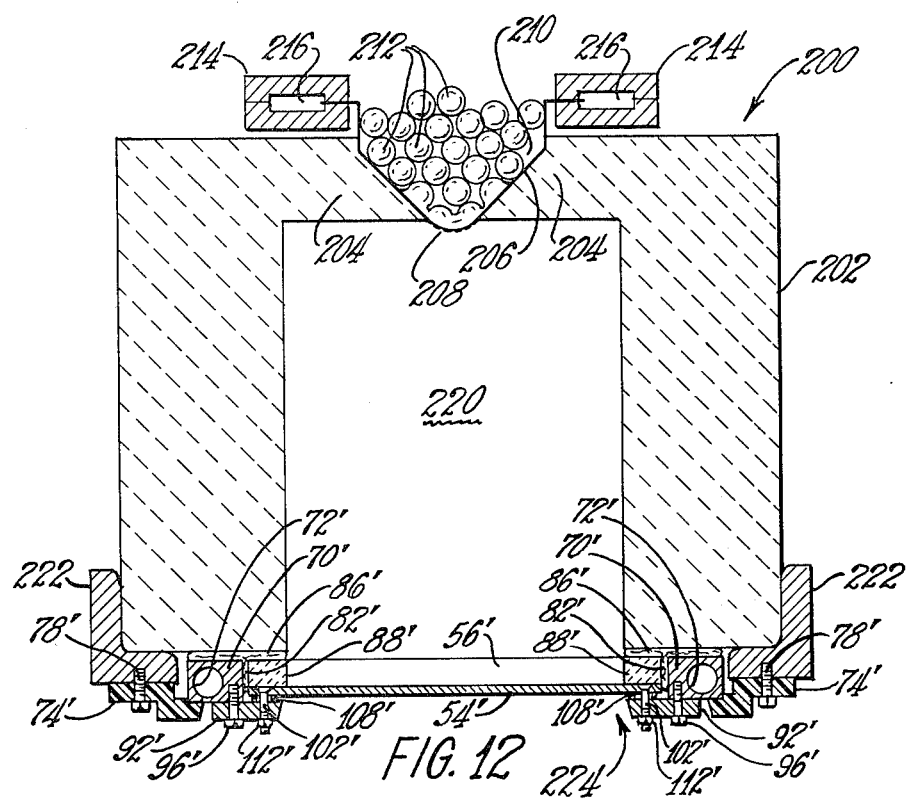
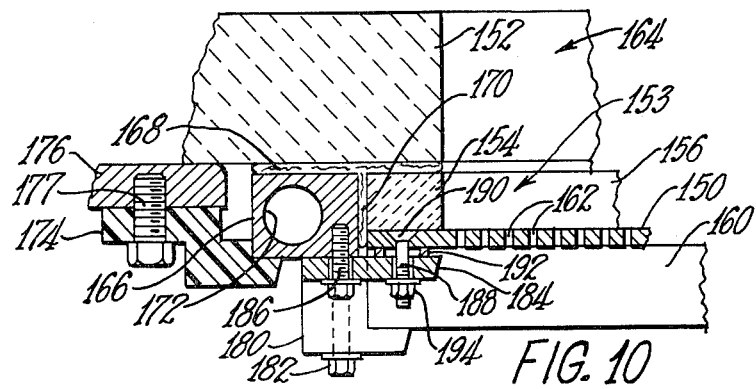
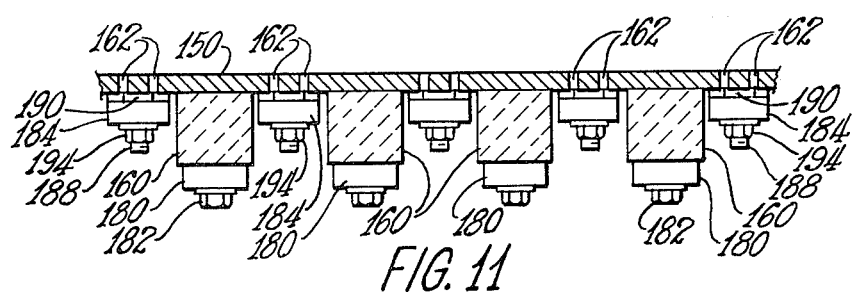

APPARATUS FOR FLOWING STREAMS OF FIBER-FORMING MATERIAL FOR ATTENUATION TO FIBERS OR FILAMENTS

TECHNICAL FIELD

This invention relates to a method of and apparatus for flowing streams of glass which are attenuated to fine continuous fibers or filaments, the apparatus including improvements in a stream feeder means or construction for flowing streams of glass.

BACKGROUND ART

The art of forming glass fibers or filaments by attenuating streams of heat-softened glass to fibers or filaments has been known for many years and it has been conventional practice to utilize a stream feeder or bushing construction fashioned entirely of precious metal, such as an alloy of platinum and rhodium, the floor of the platinum alloy bushing construction having orifices through which the streams of glass flow and the streams attenuated to continuous fibers by engaging the fibers or filaments wih a pull wheel or by winding a strand of the fibers or filaments upon a spool or other rotating body. Platinum or platinum alloy has been used for stream feeders or bushings because the platinum or platinum alloy will withstand the high temperature of molten glass with a minimum of deterioration. In recent years the cost of the precious metal platinum has increased many fold so that a stream feeder or bushing construction fashioned of platinum or platinum alloy has necessitated great increases in the cost of fibers or filaments attenuated from glass streams flowing from a platinum alloy bushing or stream feeder.

DISCLOSURE OF THE INVENTION

The present invention involves a method of and apparatus for flowing streams of heat-softenable fiber-forming material, such as glass, from openings or orifices in a stream flow construction associated with a body or block of refractory or ceramic material fashioned with a cavity or chamber containing heat-softened or molten glass, the streams of glass being attenuated to continuous fibers or filaments.

The body or block formed with a cavity or chamber accommodating a quantity of molten glass is fashioned of a comparatively inexpensive refractory or ceramic material in lieu of the conventional platinum alloy body of a conventional feeder or bushing.

A stream flow section or construction is associated with the ceramic or refractory body wherein the stream flow section may be a plate means of platinum alloy supported by spaced members of refractory or ceramic, the plate having orifices for flowing streams of glass. The stream flow construction may be an oriented assemblage of several plates, strips or sections of platinum alloy wherein each of the strips or sections is provided with a plurality of openings through which streams of glass flow from the supply of molten glass in the cavity of the refractory or ceramic block or body, the strips or sections being supported by spaced ceramic means or members, this construction greatly reducing the usage of precious metal such as platinum alloy.

Electric current is supplied to the orifice plate or to each of the orifice plate sections or strips by adjustable terminal clamps so that improved heat pattern control is attained.

The regions adjacent the ceramic or refractory support members provide for improved air circulation adjacent the glass streams for controlling viscosity of the glass of the streams or for accommodating conventional fin shield constructions for controlling viscosity of the glass streams. The refractory or ceramic spacing members provide effective barriers for localizing a flooded condition and for preventing spreading of a flooded condition in the event that a flood occurs over one of the orifice plate sections or strips.

Through the use of the invention the cost of a glass flow construction or facility is greatly reduced. As the orifice plate sections or strips are preferably arranged transversely of the cavity in the refractory, ceramic block or body, electric current flow through the strips provides better heating of the glass so that the glass throughout the area of the stream flow construction or assembly is of substantially uniform temperature.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of my invention will be described in connection with the accompanying drawings in which:

FIG. 2 is a fragmentary isometric view of a form of glass stream flow or feeder construction having orificed platinum alloy strips or sections with ceramic or refractory spacing members illustrating expansion joints between certain of the platinum alloy strips or sections and the ceramic or refractory members;

FIG. 3 is a fragmentary enlarged view of a platinum alloy strip construction and a ceramic or refractory spacing member showing an expansion joint in expanded condition;

FIG. 4 is a view similar to FIG. 3 illustrating the joint in a contracted position;

FIG. 7 is a fragmentary sectional view of a portion of a construction of a glass stream flow or feeder means wherein the construction comprises strips or sections of platinum alloy spaced by ceramic or refractory members and a cover of platinum alloy sheet material;

FIG. 8 is a fragmentary sectional view similar to FIG. 7 wherein the platinum alloy strips or sections are fashioned with stream flow orifices extending therethrough and through the platinum alloy sheet, the arrangement including air blower means for lowering the viscosity of glass streams flowing through the orifices;

FIG. 9 is a fragmentary sectional view of another form of stream flow or feeder construction which embodies strips or sections of platinum alloy having depending orificed projections forming glass stream flow passages, the strips or sections being spaced by refractory or ceramic members;

FIG. 10 is a fragmentary sectional view illustrating another form of construction for flowing streams of glass comprising a planar section or plate of platinum alloy having stream flow orifices, the section being supported by members of refractory or ceramic;

FIG. 11 is a fragmentary lengthwise sectional view of a portion of the arrangement illustrated in FIG. 10, and FIG. 12 is a sectional view of a form of construction for flowing streams of glass in association with a glass marble melting facility.

BEST MODE FOR CARRYING OUT THE INVENTION

The method of the invention and the apparatus for carrying out the method are particularly adapted for use in flowing streams of glass from a construction wherein the means containing the stream flow orifices are fashioned of platinum alloy and wherein the support means for the stream flow construction and the supply chamber containing glass are fashioned of refractory or ceramic materials which are comparatively inexpensive. In the stream flow construction of the invention, the use of platinum alloy is preferably limited to the means having orifices through which streams of glass are delivered.

Figure 1:
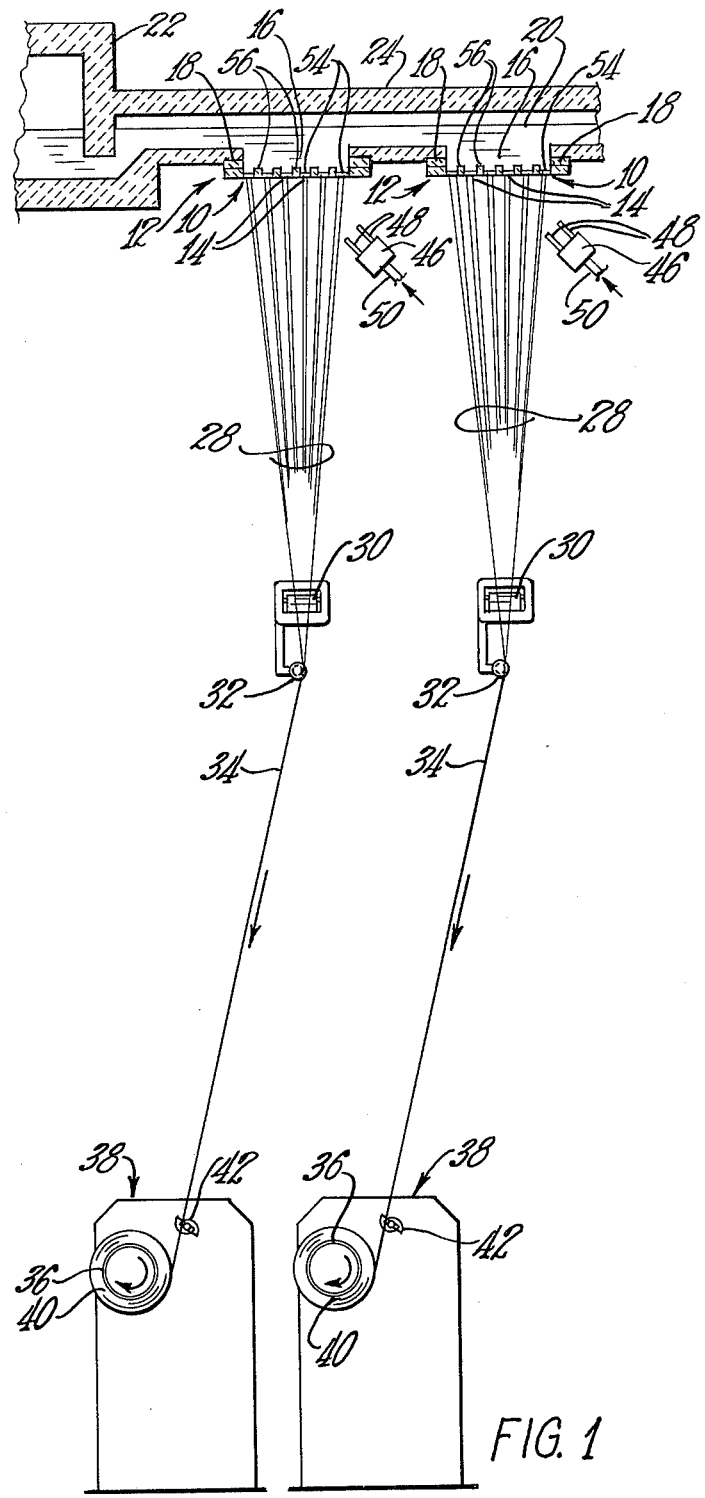
FIG. 1 is an elevational view, partly in section, of an apparatus or arrangement for forming fibers or filaments attenuated from streams of glass delivered from one form of stream flow orificed construction of the invention.

Referring to the drawings in detail and initially to FIG. 1 a form of construction or apparatus for flowing streams of glass is illustrated in association with an arrangement for attenuating the streams of glass into fine continuous filaments which are collected in a strand or group and wound into a package or otherwise processed.

The apparatus 10 for flowing streams of glass includes a means 12 providing orifices through which flow streams 14 of glass from a cavity 16 in a cavity block or body 18 of refractory or ceramic material, there being two means 12 for flowing glass streams shown in FIG. 1, each means being associated with a cavity block 18.

Each cavity 16 in a cavity block construction receives heat-softened or molten glass 20 from a melting furnace 22, a forehearth 24 conveying the heat-softened or molten glass from the furnace 22 to the cavities 16 in the cavity blocks 18. Portions of the means 12, the cavity block 18 and the forehearth 24 are illustrated on a larger scale in FIG. 5.

Filaments 28 are attenuated from groups of glass streams 14 flowing from the two stream flow means 12, the two groups of filaments 28 being engaged with applicators 30 of conventional construction for applying size or other coating material to the filaments. The filaments are converged by shoes or guides 32 into linear groups or strands 34.

Each of the strands 34 is wound onto a rotating collector 36 of a winding machine 38 into a wound package 40. The linear groups or strands 34 are traversed lengthwise of the collectors 36 by traverse means 42 of conventional construction for distributing the linear groups or strands 34 lengthwise of the collectors 36 in forming the packages.

Means is provided for extracting heat from the streams of glass flowing from orifices in the means 12 to increase the viscosity of the glass to a suitable attenuating condition. As shown in FIG. 1 there are provided chambers 46, each having a plurality of nozzles 48 for delivering jets of air or other fluid for reducing the temperatures of the glass streams.

The chambers 46 are connected by tubular means 50 with a supply of fluid such as compressed air which is delivered from the jets 48 into the regions of the glass streams for raising the viscosity of the glass of the streams. It is to be understood that other means may be utilized for raising the viscosity of the glass streams to a suitable attenuating condition.

FIGS. 2 through 6 illustrate components or elements in assembly or subassemblies of the apparatus 10 which include means or floor construction 12 for the cavity block 18 for flowing glass streams in association with components of refractory for eliminating the use of platinum alloy in the container or receptacle for the glass and greatly reducing the amount of platinum alloy in the means 12 having orifices through which streams of glass flow from the cavity 16 in the cavity block 18 of refractory or ceramic.

The cavity block or body 18 providing the container or receptacle for the molten glass may be of any suitable refractory or ceramic. It has been found that a dense zircon block 18 provides a satisfactory material for retaining a supply of glass above the means or floor construction 12 provided with orifices for flowing streams of glass from the container or cavity 16.

As shown in FIGS. 2 through 6 the construction or means 12 embodies comparatively narrow plates, strips or sections 54 of platinum alloy, such as platinum rhodium alloy, associated in spaced relation as particularly shown in FIG. 2, the plates, strips or sections 54 being spaced apart by spacing members, spacers or bars 56 of refractory or ceramic material. As shown in FIG. 2, each of the platinum alloy strips 54 may be provided with two or more rows of orifices 58.

As illustrated in FIGS. 1 and 2, the platinum alloy plate means, plates, sections or strips 54 and the spacing members or bars 56 of refractory or ceramic are arranged transversely of the cavity 16 but it is to be understood that the strips or sections of platinum alloy may be arranged lengthwise of the cavity 16 and the spacing members or bars 56 arranged lengthwise in between adjacent platinum alloy plates, strips or sections.

In reference to FIG. 2, two rows of orifices 58 are illustrated in each platinum alloy strip or section but it is to be understood that a greater number of rows of orifices may be fashioned in each of the platinum alloy plates, strips or sections.

The spacer members or bars 56 of refractory or ceramic are preferably of approximately square cross section as shown in FIG. 2 to improve the thermal shock characteristics. While the spaces 56 may be made of suitable refractory or ceramic, it is preferable that the spacing members, spacers or bars 56 be made of a high purity alumina such as Aremcolox 502-1400 made by Aremco Products, Inc., Ossining, N.Y.

The spacers or bars 56 fashioned of alumina have a coefficient of thermal expansion very close to that of platinum-rhodium alloy. It is found desirable to make the stream flow construction comprising stream flow means 54 of platinum alloy and spacing members 56 with expansion joints or couplings to provide for expansion and contraction of the components or elements of the construction under differential temperatures.

An expansion joint or sealing construction is illustrated in FIGS. 2, 3 and 4. It is found that an expansion joint should be provided for every three to five inches of length of the composite construction 12. As shown in FIG. 2, there is an expansion joint for every other platinum alloy plate, strip or section and the adjacent ceramic spacer or bar 56.

In FIG. 2 the expansion joints are illustrated at 60. An expansion joint 60 is also shown in FIGS. 3 and 4. In FIGS. 2 and 3 the expansion joints 60 are shown in expanded position under comparatively low or room temperature. FIG. 4 illustrates one of the expansion joints 60 in contracted position such as is caused by the high temperature of the molten glass.

The refractory or ceramic spacing members 56 and the platinum alloy plates, strips or sections must be sealed or adhered together so that no glass leakage occurs at the junctures of the spacing members with the platinum alloy plates, strips or sections. In reference to FIGS. 2, 3 and 4, the regions of engagement of the platinum alloy strips 54 with the ceramic spacing members 56 at regions other than the expansion joints 60 must be sealed with a suitable adhesive to prevent leakage of molten glass at these connections.

The expansion joints 60 shown in FIGS. 2, 3 and 4 are members or sections of thin or sheet-like platinum alloy material of about ten thousandths of an inch (0.0254 millimeter) in thickness. One portion 62 of each platinum alloy sealing member 60 is preferably welded to an adjacent platinum alloy strip or section 54. Another portion 64 of each sealing member 60 is adhesively joined to an adjacent ceramic spacer 56. An intermediate region 66 of each member 60 joins the two portions 62 and 64 together as shown in FIGS. 2 and 3 so that there is a small amount of space for expansion of a platinum alloy strip 54 and an adjacent spacer 56.

The sealing means or joint 60 shown in FIG. 3 is a normal position for the sealing member under normal temperature conditions. FIG. 4 illustrates one of the sealing members 60 in a closed position under the influence of high temperature of the molten glass for preventing leakage of glass at the regions of the expansion joints 60.

The junctures of the platinum alloy strips or sections 54 with the ceramic or refractory spacing members 56 are sealed or joined together by a suitable adhesive. An adhesive suitable for the purpose is made by Aremco Products, Inc. of Ossining, N.Y., and marketed under the name Ultra-Bond 552. The portion 62 of each of the expansion joints 60 is joined with a strip or section 54 of platinum alloy, and the portion 64 of each of the expansion joints 60 is joined or adhered to a ceramic or refractory spacer 56 by an adhesive such as Ultra-Bond 552.

Figure 5:
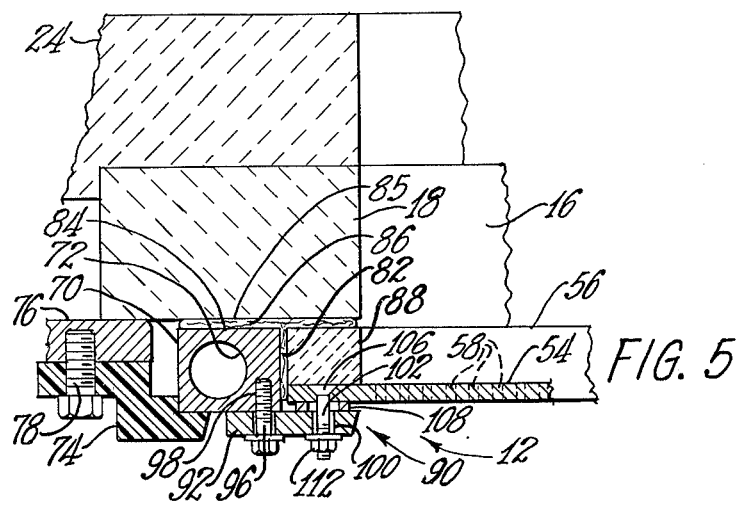
FIG. 5 is a fragmentary enlarged detail sectional view illustrating an assemblage of the construction shown in FIGS. 1 and 2 associated with a cavity block and a forehearth construction.
Figure 6:
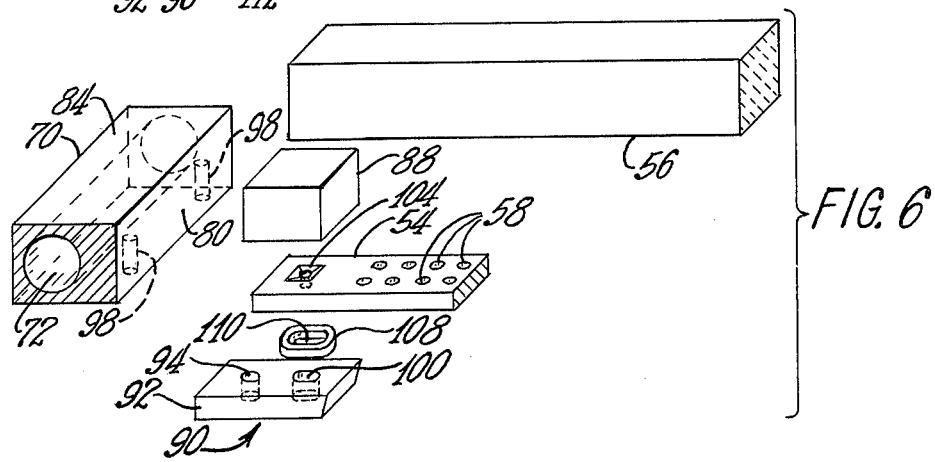
FIG. 6 is an isometric view of portions of the components shown in FIG. 5 in disassembled relation.

FIGS. 5 and 6 illustrate a method of assembly of components of the construction 12, the cavity block 18 as well as the bus bar and cooling manifold constructions for conveying electrical energy to the plate means, strips or sections 54 of platinum alloy, and support means for the various components or elements of the arrangement or apparatus for flowing streams of glass.

In the arrangement shown in FIGS. 1 through 6, the platinum alloy plate means, strips or sections 54 and the ceramic spacers or spacing members 56 extend transversely of the receptacle or cavity block 18 and the elongated cavity 16 therein. Disposed lengthwise of each lengthwise portion of the cavity block 18 is a combined bus bar and support means 70, there being two bus bars, one adjacent each of the end regions of the platinum alloy plate means, strips or sections 54 and ceramic spacing members 56.

Each of the bus bars 70 is provided with a passage 72 through which a cooling fluid, such as water, is circulated. The bus bars 70 are connected by current-conducting means (not shown) with a supply of electric energy for heating the platinum alloy plate means, strips or sections 54.

Each bus bar 70 is supported by a plurality of brackets 74 of refractory, ceramic or other nonmetallic material from a steel frame construction 76 of conventional construction by means of bolts 78, the bolts 78 extending through openings in the brackets 74 and threaded into threaded openings in the steel structure 76 as shown in FIG. 5.

The end regions of the refractory or ceramic spacing members 56 and the end regions of the platinum alloy plate means, sections or strips 54 are in adjacent relation to the side planar surface 80 of the bus bar 70. A fiberfrax gasket or sealing means 82 of conventional construction is disposed between the end surfaces of the platinum alloy strips 54 and the ends of the ceramic spacing members 56 and the surface 80 of the bus bar construction 70.

A fiberfrax gasket 86 is disposed between the upper surfaces 84 of the bus bar 70, the upper surface of each of the ceramic spacing members 56 and the lower surface 85 of the cavity block 18.

Disposed between the adjacent end regions of each of the ceramic spacing members 56 is a block, insert or body 88 of refractory or ceramic which is engaged with the upper end region of an adjacent platinum alloy strip or section 54. The inserts 88 are sealed with the fiberfrax gaskets 82 and 86.

Thus, the blocks 88 of ceramic or refractory close the gaps beween the ends of adjacent ceramic spacing members 56, the blocks 88 being adhesively joined with the upper surfaces of the end regions of the platinum alloy strips or sections 54.

A separate clamping and current-conducting means 90 is provided between each of the platinum alloy plate means, sections or strips 54 and a bus bar 70, the clamping means each being individually adjustable so as to compensate for expansion of the platinum alloy plate means, strips or sections so that an improved heat pattern is provided.

One form of clamping arrangement 90 is shown in assembled condition in FIG. 5 and certain components of the clamping arrangement are illustrated in disassembled relation in FIG. 6. In this form of the invention there is an individual terminal clamping means for each platinum alloy strip or section 54 so as to provide for current flow from a bus bar 70 to each of the strips or sections 54 so that the current flow through each of the strips or sections 54 may be maintained substantially uniform whereby the streams of glass flowing through the orifices in the strips or sections will be of substantially uniform viscosity.

A terminal clamp or terminal member 92 is provided for each end of each platinum alloy strip or section, the terminal clamp 92 being illustrated per se in FIG. 6. Each terminal clamp 92 is provided with an opening or bore 94 accommodating a bolt 96, each bolt being threaded into a threaded opening 98 in a bus bar 70.

Each of the clamps 92 is secured to a platinum alloy plate means, strip or section 54 by means allowing for limited adjustment for each strip or section 54. Each clamp 92 is provided with an opening 100 which is of larger diameter than the diameter of a bolt 102 securing each terminal clamp 92 to a strip or section 54.

The upper surface of each of the strips or sections 54 is provided with a pyramidally-shaped recess 104 which receives a frusto pyramidally-shaped head 106 of each bolt 102, the pyramidally-shaped recess and head preventing rotation of the bolt 102.

Disposed between each of the strips or sections 54 and the adjacent terminal clamp is a washer or spacer 108, the opening 110 in each washer or spacer 108 being generally oblong and of a greater internal dimension than the diameter of the bolt 102. The washer or slotted spacer 108 may slide relative to a strip or section 54 and the adjacent terminal clamp 92 to effect changes in the terminal clamping position.

When the nuts 112 on the bolts 102 are drawn up, the bolts and washers conduct electrical energy from the bus bar 70 to each of the platinum alloy plate means, strips or sections 54. The oversize opening 100 in each of the terminal clamps 92 allows limited lengthwise and widthwise movements of the plate means, strips or sections 54.

During heating of the construction 12 preparatory to flowing streams of glass from the orifices in the plate means, strips or sections 54 the clamping nuts 112 on the bolts 102 may be loosened as required to allow for thermal expansion of the platinum alloy plate means, strips or sections 54.

After the cavity block 18, the refractory or ceramic spacers 56 and the platinum alloy plate means, strips or sections 54 attain a high temperature, the nuts 112 may be drawn up to assure constant current flow from the terminal clamps 92 through the platinum alloy plate means, strips or sections 54. The blocks 88 are joined to the spacing members 56 and the platinum alloy strips or sections 54 by an adhesive such as Ultra-Bond 552 hereinbefore mentioned. The water cooled bus bar 70 reduces the temperature of the glass at the region of the fiber frax gaskets and freezes the glass at said region to prevent leakage of the glass.

The platinum alloy plate means, strips or sections 54 containing rows of orifices 58 may be made thinner than the platinum alloy floor integral with a conventional platinum alloy bushing or stream feeder because the plate means, strips or sections 54 of platinum alloy are adequately supported by the spacers of refractory or ceramic 56 and hence there would be no sagging of the construction 12.

The construction above described of a means 12 for flowing streams of glass from a ceramic receptacle or cavity block effects substantial savings in the use of platinum alloy as the only platinum alloy utilized in the construction illustrated in FIGS. 1 through 6 is that amount required for the plate means, strips or sections 54 whereby the cost of flowing streams of glass from a container construction of the invention is only a fraction of the amount that would be necessary in utilizing a platinum alloy stream feeder or bushing of standard character.

The arrangement comprising the lower surfaces of the platinum alloy plate means, strips or sections 54 and the refractory or ceramic spacing members 56 lying substantially in a common plane prevents or minimizes the tendency for flooding of the entire stream flow section by reason of the spacing members of refractory or ceramic which function as barriers to flooding of the glass.

FIGS. 7 and 8 illustrate a modified arrangement of glass stream feeding apparatus wherein the stream flow construction or arrangement embodies a plurality of platinum alloy plates, strips or sections arranged in spaced relation by refractory or ceramic spacing members or spacers in combination with a comparatively thin sheet of platinum alloy covering the assemblage of platinum plates, strips or sections and refractory or ceramic spacing members.

In FIG. 7 there is illustrated in cross-section a plurality of plates, strips or sections 120 of platinum alloy with members 122 of ceramic or refractory arranged transversely of a lengthwise assemblage of plates, strips or sections and spacing members. The platinum alloy plates, strips or sections 120 may be adhered to the adjacent spacing members of ceramic or refractory by a suitable adhesive such as Ultra-Bond 552 hereinbefore mentioned.

A sheet 124 of platinum or platinum alloy may be superposed over the entire assemblage of platinum alloy plates, strips or sections 120 and refractory or ceramic spacers 122 in order to avoid leakage of glass from the cavity of a cavity block above the assemblage, the cavity block being of a character illustrated at 18 in FIGS. 1 and 5.

In assembling the components or elements of the construction shown in FIG. 7, the platinum alloy plates, strips or sections 120 may be first adhesively joined to the refractory or spacing members or bars 122. The platinum alloy plate or sheet 124 may then be shaped or contoured to the configuration shown in FIG. 7 and the sheet or plate 124 preferably welded to the platinum alloy plates, strips or sections and may be adhered to the ceramic or refractory spacing members or bars 122, this assemblage being illustrated in FIG. 8.

The platinum alloy plates, strips or sections 120 and the sheet or member 124 of platinum alloy may then be drilled with holes or orifices 126 which may be in rows as illustrated in FIG. 8, the holes or orifices 126 being adapted to flow streams of molten glass from the glass in the cavity block above the assemblage.

The holes are preferably drilled simultaneously through the platinum or platinum alloy sheet 124 and the platinum alloy plates, strips or sections 120 so that flow of glass through the openings is not inhibited. The platinum alloy sheet or member 124 being adhesively joined with the platinum alloy plates, strips or sections 120 and the refractory or ceramic spacing members or bars 122 prevents any leakage of glass and glass flow is confined to the orifices 126. The sheet or member 124 of platinum or platinum alloy may be comparatively thin preferably of a thickness in a range of five thousandths of an inch (0.0254 millimeter) to ten thousandths of an inch (0.0127 millimeter).

The glass of the streams exiting from the orifices 126 in the platinum alloy plates, strips or sections 120 may have its viscosity raised to a more efficient attenuating condition by delivery of air or other medium for reducing the temperature of the glass streams adjacent the orifices 126. A chamber 46' may be provided with compressed air or other medium supplied from a source through a tube 50'. Nozzles 48' supplied with cooling medium from the chamber 46' direct the streams or jets of air or cooling medium onto the streams of glass flowing through the orifices 126.

The construction shown in FIG. 8 wherein the lower plane of the platinum alloy strips or sections 120 coincides with the lower plane surfaces of the spacing members or bars tends to prevent flooding of the glass or at least minimizing or localizing flooding at a single platinum alloy plate, strip or section because the refractory or ceramic material tends to prevent flooding from one group of orifices in a plate, strip or section to an adjacent platinum alloy plate, strip or section.

FIG. 9 illustrates an assemblage or construction for flowing streams of glass for attenuation to filaments of a character similar to that illustrated in FIG. 8. In the arrangement shown in FIG. 9, the plates, strips or sections 130 of platinum alloy are arranged in spaced relation by refractory or ceramic spacing members or bars.

A sheet or member 134 of platinum or platinum alloy is fitted over the assemblage of platinum alloy plates, strips or sections and refractory or spacing members or bars 132. The spacing members or bars 132 may be joined with the platinum alloy plates, strips or sections 130 by a suitable adhesive such as Ultra-Bond 552 hereinbefore mentioned. The sheet or member 134 of platinum or platinum alloy is joined with the strips or sections and the spacing members or bars by the same type of adhesive or other suitable adhesive material.

In the form shown in FIG. 9, each of the platinum alloy plates, strips or sections 130 is provided with rows of depending tips or projections 136. Each of the tips is provided with a passage or orifice 138 through which molten glass from a cavity block may flow through the orifices in the projections forming streams of glass.

The sheet or member 134 of platinum or platinum alloy may be drilled after assembly of the projections 136 with the platinum alloy plates, strips or sections 130 so that the glass flows through openings in the sheet or member 134 in registration with the passages or orifices 138 in the depending projections 136.

A construction of the character illustrated in FIG. 9 facilitates the use of fin shields or similar means for conveying heat away from the glass of the streams flowing from the passages or orifices 138 to increase the viscosity of the glass for efficient attenuation of the glass streams to fibers or filaments.

As illustrated in FIG. 9, a manifold 142 may be disposed along a transverse edge region of the assemblage of orificed projections and platinum alloy plates, strips or sections 130 and the ceramic spacing members. Secured to the manifold 142 are fin shields 144, there being at least one fin shield beneath each of the ceramic spacing members or bars 132. The manifold 142 accommodates circulating cooling fluid, such as water, for conveying away heat from the glass streams transferred to the fin shields 144.

While FIG. 9 illustrates a single fin shield beneath each of the ceramic spacing members 132, it is to be understood that more than one fin shield may be provided beneath each of the ceramic spacing members if it is desired to transfer more heat away from the glass of the streams flowing from the orifices or passages 138 in the depending projections 136.

The construction or assemblage shown in FIG. 9 of orificed projections depending from platinum alloy plates, strips or sections 130 may be referred to as a tip section as distinguished from the stream flow construction shown in FIGS. 1, 2, 5 and 8 wherein tipless orifices 126 in the platinum alloy plates, strips or sections facilitate flow of glass streams from a cavity block 18 of the character shown in FIGS. 1 and 5.

FIGS. 10 and 11 illustrate a modified arrangement or apparatus for flowing streams of glass from a container or cavity block of refractory through orifices in a platinum alloy plate means, section or glass stream delivery orificed construction which is supported by spaced members or bars of refractory or ceramic material.

In the arrangement shown in FIGS. 10 and 11 the orificed platinum alloy glass stream delivery means 150 is preferably formed as a flat plate or section providing a bottom member for a ceramic or refractory cavity block 152, the cavity block being similar to the cavity block 18 shown in FIG. 5.

In the arrangement shown in FIG. 10 the cavity block 152 is provided with an extension means 153 which includes transversely extending ceramic or refractory members or bars 154 disposed above and adjacent each end region of the stream flow plate or section 150. The extension 153 includes lengthwise extending refractory or ceramic members or bars 156, the ceramic or refractory members 154 and 156 providing a rectangular frame-like construction between the lower surface of the cavity block 152 and the stream flow plate construction 150.

The platinum alloy plate construction 150 is supported by a plurality of transversely extending refractory or ceramic members or bars 160 which are spaced lengthwise and disposed beneath the plate means 150. The regions of the stream flow plate means 150 between the spaced support members 160 are provided with transversely arranged rows of orifices 162 through which flow streams of heat-softened or molten glass from the chamber or cavity 164 in the cavity block 152.

An adhesive, such as Ultra-Bond 552, may be used to seal the joints between the members 154, 156 and the platinum alloy plate construction 150. A bus bar 166 of metal is arranged adjacent each lengthwise edge region of the plate construction 150, one of the bus bars being shown in FIG. 10.

A fiber frax gasket 168 is disposed between the lower surface of the cavity block 152 and surfaces of the members 154 and the bus bar 166. A fiber frax gasket 170 is disposed between the members 154 and the bus bar 166. The bus bar 166 has a chamber 172 accommodating water or other cooling fluid which reduces the temperature of the glass adjacent the fiber frax gaskets, the reduced temperature freezing the glass adjacent the gaskets providing a frozen glass seal preventing leakage of glass. The fiber frax gasket 170 allows for thermal expansion of the platinum alloy plate means 150. Water cooling the bus bar prevents the bus bar from melting under the ambient high temperatures.

The members 154 and 156 of refractory or ceramic, the stream flow plate construction 150, the spacers or bars 160 of refractory or ceramic and the metal bus bars 166 are supported by clamping brackets 174 of insulating material secured to a conventional frame or support construction 176 by means of bolts 177. The bus bars 166 are supplied with electric current through suitable current conductors (not shown) in a conventional manner.

The members or bars 160 of refractory or ceramic are arranged in spaced relation as shown in FIG. 11 and the end regions of each of the members 160 is individually supported by a member or clamp 180. Each of the clamps 180 is secured to a bus bar 166, the clamps adjacent the opposite ends of the members 160 being supported by the other bus bar (not shown).

Bolts 182 threaded into the bus bar 166 secure each clamp 180 in engagement with a member 160 in the manner shown in FIG. 10. Disposed between end regions of adjacent members or bars 160 are terminals or terminal clamps 184 which are secured to the bus bar by bolts 186. Each of the terminal clamps 184 is bored to receive a bolt 188, each bolt having a frusto-pyramidal head 190 which engages in a frusto-pyramidal recess in the plate means or plate construction 150.

Disposed between each of the clamps 184 and the plate construction 150 is a washer or spacer 192 which is of the character of the spacer illustrated at 108 in FIG. 6. The washer or spacer 192 is generally oblong and of greater internal dimension than the diameter of the bolt 188 so that the washer 192 may accommodate thermal expansion of the plate construction. Each of the bolts 188 is provided with a securing nut 194.

During heating of the construction preparatory to flowing streams of glass from the orifices 162 in the plate means 150, the clamping nuts 194 may be loosened to allow for thermal expansion of the platinum alloy plate means 150. After the components have attained the temperature of the molten glass, the nuts 194 may be drawn up to assure current flow through each of the clamps 184 to the plate means 150.

Through this arrangement of conveying electric energy to the orifice plate construction 150 through the several terminal clamps or lugs 184, the heat pattern of the molten glass adjacent the plate construction 150 is substantially uniform so that all of the streams of glass flowing through the orifices 162 are of substantially the same viscosity.

The arrangement shown in FIGS. 10 and 11 effects substantial savings in the use of the precious metal, platinum, as the flow plate construction 150 is of platinum or platinum alloy whereas the cavity block 152 and the members 154 and 156 and members or bars 160 are made of refractory or ceramic.

As the plate means or construction 150 is supported at spaced regions by the members 160 of refractory or ceramic, the platinum alloy plate means 150 may be of lesser thickness than the thickness of a floor construction of a conventional platinum alloy bushing and thereby effect additional savings in the cost of an arrangement or equipment for flowing glass streams.

FIG. 12 is a sectional view illustrating a form of the invention associated with or incorporated in a glass marble melting apparatus or facility whereby the molten glass is contained within a chamber of a cavity block construction. The apparatus or arrangement 200 is inclusive of a cavity block 202 fashioned of refractory or ceramic material such as dense zircon.

The cavity block 202 has upper wall portions 204. Disposed centrally between the wall portions 204 is an electrically energizable heating member 206 of generally V-shaped configuration having an apex region 208 which is perforated or in the form of a screen. The heating member 206 is preferably made of platinum alloy which is comparatively thin and provides a melting chamber 210 for heating and melting marbles of glass or pieces of glass 212 to a flowable state in the melting chamber 210.

The electrically energizable member 206 is connected with bus bars 214 which are connected with a source of electric energy, the bus bars being fashioned with central passages 216 accommodating cooling fluid, such as water, to maintain the bus bars at a reduced temperature.

The marbles or pieces of glass 212 may be fed into the chamber 210 at a desired rate from a supply (not shown) by conventional gating means (not shown). The molten glass flowing through the perforated screen-like portion 208 fills the chamber 220 in the cavity block 202. The cavity block 202 is supported by frame members 222 of conventional construction.

The assemblage of elements or components for flowing streams of glass from the chamber 220 is similar to the assemblage of elements or components illustrated in FIG. 5 and hereinbefore described. The construction or arrangement 224 for flowing streams of glass shown in FIG. 12 includes a plurality of plates, sections or strips 54' extending transversely of the cavity block 202.

The plates, strips or sections 54' are spaced apart by members or bars 56' of refractory or ceramic. Arranged between the end regions of adjacent spacing members 56' are small blocks or inserts 88' of refractory or ceramic. A bus bar 70' is disposed lengthwise adjacent the ends of the spacing members 56' and the inserts 88', each bus bar being fashioned with a passage or chamber 72' accommodating water or other cooling fluid.

Each of the bus bars is connected by current-conducting means (not shown) with a supply of electric energy for heating the platinum alloy strips or sections 54'. The bus bars and associated elements are supported from the frame structure 222 by brackets or clips 74' of insulating material which are secured to the frame structure 222 by means of bolts 78'.

The platinum alloy plates, strips or sections 54', members 56' and inserts 88' are supported by the bus bars 70' by clamps 92'. The clamps 92' are secured to the bus bars 70' by means of bolts 96'. The platinum alloy plates, strips or sections 54' are secured to the clamps 92' by means of bolts 102'.

Washers or spacers 108' are disposed between the platinum alloy plates, strips or sections 54' and the clamps 92' to facilitate establishing an effective electrical circuit from the clamps 92' to the platinum alloy plates, strips or sections 54' when the nuts 112' on the bolts 102' are drawn up.

Fiber frax gaskets 82' and 86' are provided adjacent the spacing members 56', insert blocks 88', bus bars 70' and the lower surface of the cavity block 202. The cooling water flowing through the bus bars 70' reduces the temperature of the glass adjacent the gaskets, freezing the glass to prevent leakage.

Expansion joints, such as the joints shown at 60 in FIGS. 2, 3, and 4 may be used between certain of the platinum alloy plates or sections 54' and the spacing members 56' of refractory or ceramic.

It is to be understood that the constructions or assemblages shown in FIGS. 8, 9, 10 and 11 may be utilized in association with the cavity block construction 202 for flowing glass streams through orifices in a platinum alloy plate or assemblage of platinum alloy plate means, strips or sections provided with stream flow orifices.

The oblong washers or spacers 108, shown in FIGS. 5 and 6, the oblong washers or spacers 192, shown in FIG. 10, and the oblong washers or spacers 108', shown in FIG. 12, perform several functions involving the flow of electric energy. These washers are of generally oblong configuration and the oblong opening in each washer or spacer provides ample clearance for adjustment, the openings being of substantially greater internal dimensions than the diameters of the bolts passing through the washers for clamping the platinum alloy plate means, strips or sections to the clamping means. The oblong washers or spacers are utilized to control the heat pattern by adjusting the relative positions of the washers.

The washers control the location of the electrical energy input and thus control the power generation distribution. The specific locations of the washers also determine the amount of heat removed from the platinum alloy plate means, strips or sections to the bus bar. The specific locations of the washers have a substantial effect particularly upon the temperature distribution (heat pattern) near the ends of the platinum alloy plate means, strips or sections.

The orificed plate means, strips or sections of platinum alloy utilized for flowing streams of glass are preferably made of an alloy comprising about ninety percent platinum and ten percent rhodium. It is to be understood that other metals may be alloyed with platinum for use in the arrangements of the invention.

In the forms of the invention herein disclosed, the use of platinum or platinum alloy has been greatly reduced as compared with the conventional platinum alloy bushing or stream feeder without sacrificing advantages derived from the use of conventional platinum alloy bushings or stream feeders.

It is apparent that, within the scope of the invention, modifications and different arrangements may be made other than as herein disclosed, and the present disclosure is illustrative merely, the invention comprehending all variations thereof.

I claim:

1. Apparatus for delivering streams of heat-softened glass comprising a body of refractory having a cavity containing heat-softened glass, a floor construction associated with the body of refractory, said construction including a plurality of platinum alloy sections arranged in spaced relation, each section having orifices for flowing glass streams from the glass in the cavity of the refractory body, members of refractory disposed between the platinum alloy sections, the platinum alloy sections being in sealing relation with the members of refractory.

2. Apparatus for delivering streams of heat-softened glass comprising a body of refractory having a cavity containing heat-softened glass, a floor construction associated with the body of refractory, said construction including platinum alloy means, said platinum alloy means including a plurality of platinum alloy sections in spaced relation, each section having at least one row of stream flow orifices for flowing glass streams from the glass in the cavity of the refractory body, members of refractory disposed between the platinum alloy sections, and sealing means between the platinum alloy sections and the members of refractory.

3. Apparatus according to claim 2 wherein the refractory of the members is alumina.

4. Apparatus according to claim 2 wherein the refractory of the body is of high density zircon.

5. Apparatus for delivering streams of heat-softened glass comprising a body of refractory having a cavity containing heat-softened glass, a floor construction for the body of refractory, said floor construction including a plurality of platinum alloy sections arranged in spaced relation, orifices in said sections for flowing glass streams from the glass in the cavity of the refractory body, support means for the platinum alloy sections comprising members of refractory disposed between adjacent sections of platinum alloy, a bus bar construction for conducting electric current, a plurality of current-conducting clamping means, each of said clamping means being secured to one of the platinum alloy sections and the bus bar construction for conducting electric current from the bus bar construction through the platinum alloy sections, and means supporting the bus bar construction.

6. Apparatus according to claim 5 including sealing means for securing the platinum alloy sections to the members of refractory.

7. Apparatus for delivering streams of heat-softened glass comprising a body of refractory having a cavity containing heat-softened glass, a floor construction for the body of refractory, said floor construction including a plurality of platinum alloy sections arranged in spaced relation, members of refractory disposed between the platinum alloy sections, orifices in said sections for flowing glass streams from the glass in the cavity of the refractory body, and expansion joints between certain of the platinum alloy sections and adjacent refractory members.

8. Apparatus according to claim 7 wherein each expansion joint comprises a strip of alloy containing platinum.

9. Apparatus according to claim 8 wherein each of the strips is in sealing engagement with the adjacent platinum alloy section and member of refractory.

10. Apparatus for delivering streams of heat-softened glass comprising a body of refractory having a cavity adapted to contain heat-softened glass, a floor construction associated with the body of refractory, said floor construction including a plurality of spaced ceramic members and a plurality of sections of platinum alloy, the sections of platinum alloy being joined with the ceramic members in bridging the spaces between adjacent ceramic members, said platinum alloy sections being sealed to the ceramic members, short sections of ceramic material disposed adjacent the end regions of the ceramic members, sealing means between the lower surface of the cavity body and the ceramic members and short sections of ceramic, the sections of platinum alloy between adjacent ceramic members being provided with rows of orifices through which flow streams of glass from the cavity in the body, and means for supplying electric energy to each of said platinum alloy sections.

11. Apparatus according to claim 10 wherein the means for supplying electric energy comprises bus bars connected with a source of electric energy, and means establishing electrical contact between each of the platinum alloy sections and the bus bars.

12. Apparatus for delivering streams of heat-softened glass comprising a block of refractory having a cavity adapted to contain heat-softened glass, a floor construction for the block of refractory, the floor construction including a plurality of spaced ceramic members and a plurality of strips of platinum alloy, the strips of platinum alloy bridging the spaces between adjacent ceramic members, said platinum alloy strips being in sealing relation with the ceramic members, short sections of ceramic material disposed adjacent the end regions of the ceramic members, said short sections of ceramic material being sealed to the adjacent ceramic members and the platinum alloy strips, the strips of platinum alloy between adjacent ceramic members being provided with orifices through which flow streams of glass from the cavity in the block, a bus bar construction connected with a source of electric energy, and means for conducting electric energy from the bus bar construction through the platinum alloy strips.

13. Apparatus according to claim 12 wherein the means for conducting electric energy from the bus bar construction through the platinum alloy strips include an individual clamping means between the end regions of each of the platinum alloy strips and the bus bar construction, and a slotted spacer between the end regions of each of the platinum alloy strips and the adjacent clamping means, said slotted spacers being adjustable to control electric energy distribution.

14. Apparatus for delivering streams of heat-softened glass comprising a body of refractory having a cavity containing heat-softened glass, a floor construction for the body of refractory, said floor construction including a plurality of platinum alloy sections arranged in spaced parallel relation, orifices in said sections for flowing glass streams from the glass in the cavity of the refractory body, support means for the platinum alloy sections comprising members of refractory disposed between adjacent sections of platinum alloy, a comparatively thin sheet of platinum alloy engaging the upper surfaces of the platinum alloy sections and members of refractory, said sheet of platinum alloy having orifices in registration with the orifices in said sections of platinum alloy.

15. Apparatus for delivering streams of heat-softened glass comprising a body of refractory having a cavity containing heat-softened glass, a floor construction for the body of refractory, said floor construction including a plurality of platinum alloy sections arranged in spaced parallel relation, said sections having rows of depending projections, said projections having passages therein for flowing glass streams from the glass in the cavity of the refractory body, support means for the platinum alloy sections comprising members of refractory disposed between adjacent sections of platinum alloy, a comparatively thin sheet of platinum alloy engaging the upper surfaces of the platinum alloy sections and members of refractory, said sheet of platinum alloy having orifices in registration with the passages in said depending projections.

16. Apparatus for delivering streams of heat-softened glass comprising a body of refractory having a cavity containing heat-softened glass, a floor construction for the body of refractory, said floor construction including platinum alloy plate means having orifices for flowing glass streams from the glass in the cavity of the refractory body, said floor construction including a plurality of spaced members of refractory adjacent the platinum alloy plate means, a bus bar construction connected with a source of electric energy, means for conducting electric energy from the bus bar construction through the platinum alloy plate means, said conducting means including clamping means between the bus bar construction and the platinum alloy plate means, a slotted spacer between each of the clamping means and the platinum alloy plate means, said slotted spacers being adjustable relative to the plate means to control electric energy distribution.

17. Apparatus for delivering streams of heat-softened glass comprising a body of refractory having a cavity containing heat-softened glass, a floor construction for the body of refractory, said floor construction including a plurality of platinum alloy strips arranged in spaced relation, orifices in said platinum alloy strips for flowing glass streams from the glass in the cavity of the refractory body, members of refractory disposed between adjacent strips of platinum alloy, a bus bar construction connected with a source of electric energy, means for conducting electric energy from the bus bar construction through the platinum alloy strips, said conducting means including clamping means between each of the strips and the bus bar construction, a slotted spacer between each of the clamping means and the platinum alloy strips, said slotted spacers being adjustable relative to the platinum alloy strips to control electric energy distribution.

* * * * *